Sept. 18, 1928.
D. A. DAVISON
INTERNAL COMBUSTION ENGINE
Filed April 22, 1927
1,684,434
2 Sheets-Sheet 2
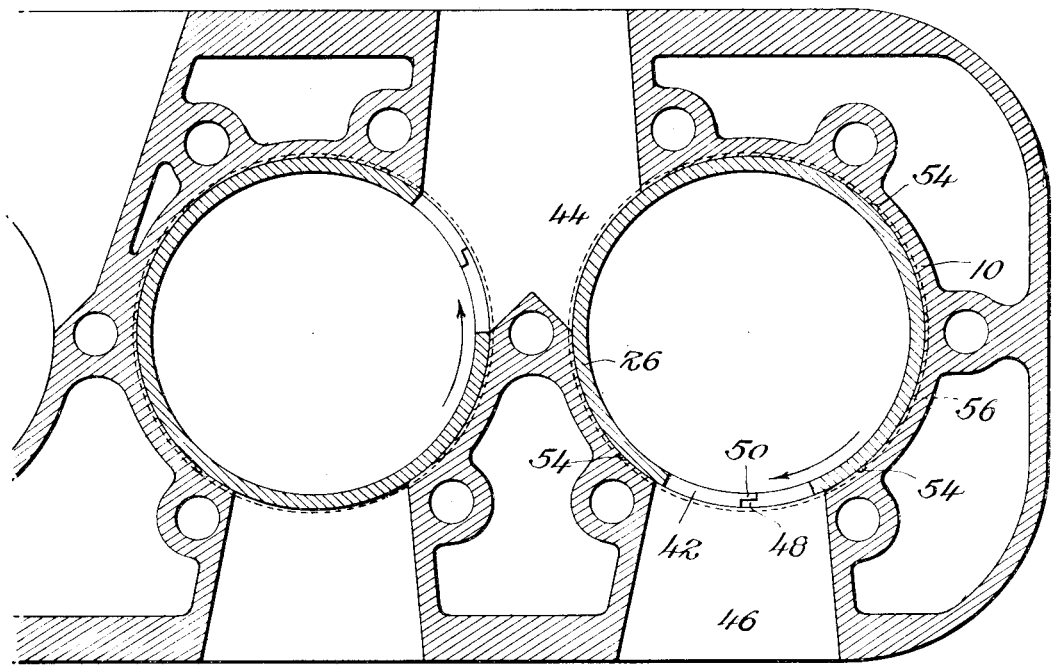
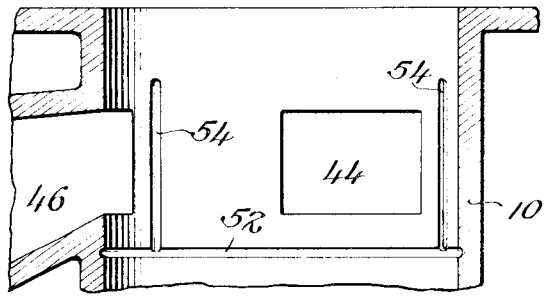
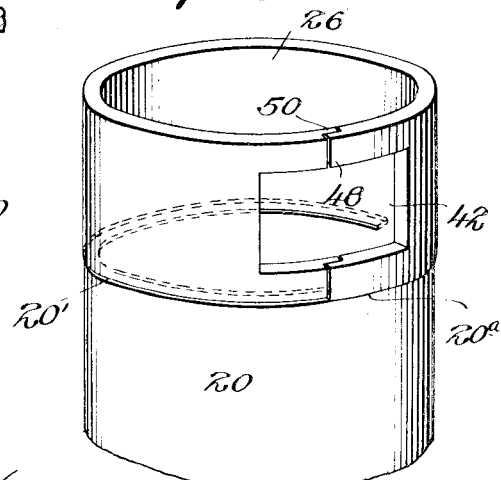
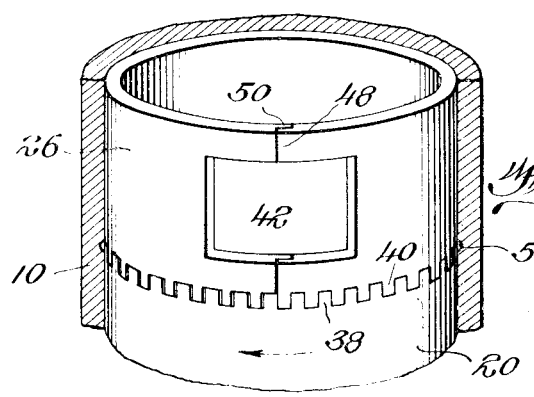
Inventor
D. A. Davison,
by Bright & Bailey
Attorneys Patented Sept. 18, 1928.

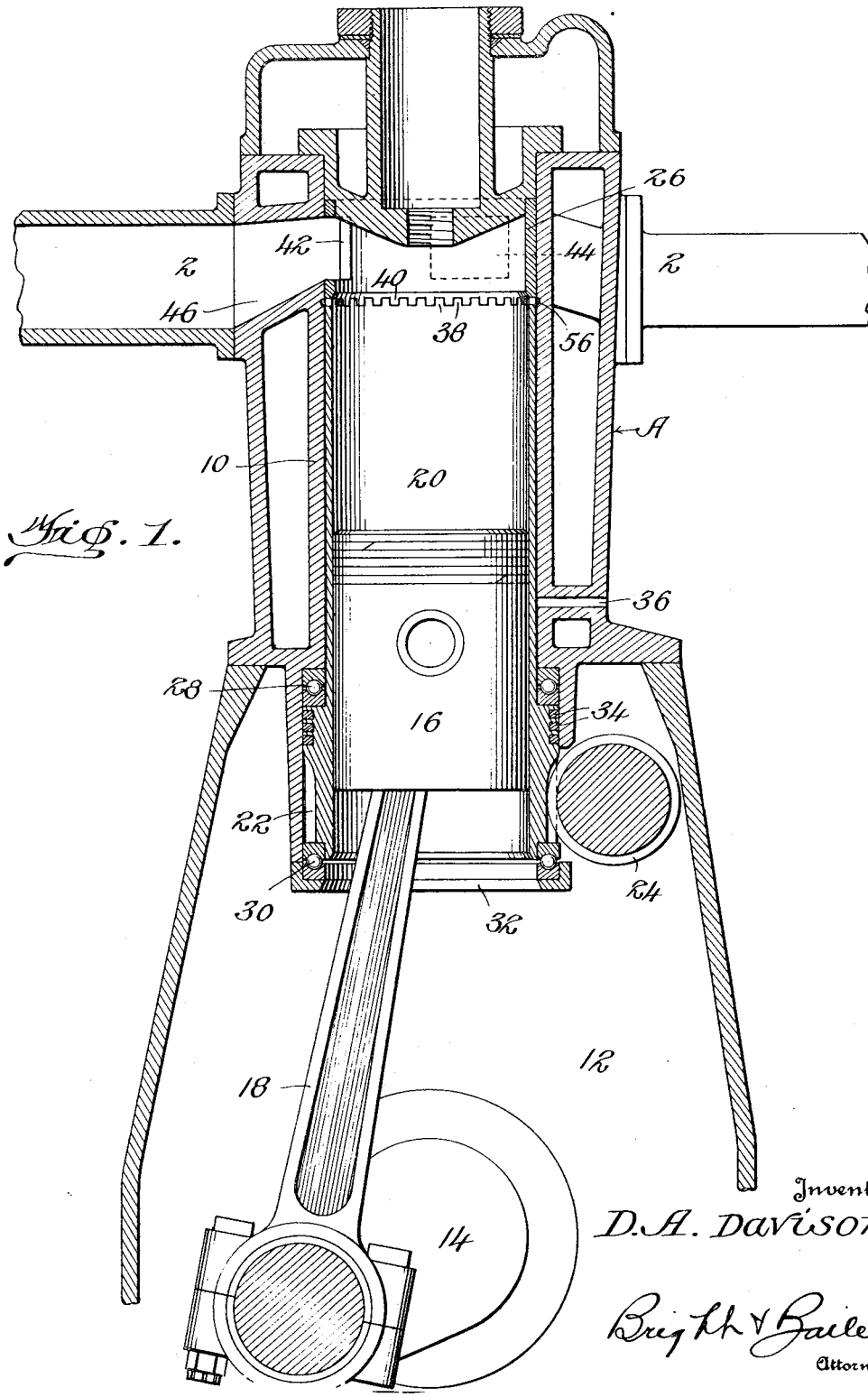

1,684,434

UNITED STATES PATENT OFFICE.

DORSETT A. DAVISON, OF RICHMOND, VIRGINIA.

INTERNAL-COMBUSTION ENGINE.

Application filed April 22, 1927. Serial No. 185,898.

My invention relates to internal combustion engines and has particular reference to improvements in rotary valves of the same general type disclosed in my prior Patent 1,271,137 granted July 2, 1918 for controlling the intake of explosive gases to and the exhaust of burnt gases from such engines, my purpose, generally speaking, being to provide certain modifications in and additions to rotary valves of the type disclosed by said patent whereby their durability and efficiency will be greatly enhanced.

As disclosed in my aforesaid patent, a rotary valve mechanism of the type in which my present improvements may be incorporated consists essentially of a valve proper in the form of a rotatable split ring having a port therein and a driver therefor in the form of a rotatable liner having toothed connection with said ring. A valve mechanism of this type possesses numerous advantages, some of which are mentioned in my patent referred to, but at the same time experiments have demonstrated that such a valve mechanism also possesses certain disadvantages, among which may be mentioned the tendency of the split ring to bind against its seat with consequent excessive wear and the necessity of material power to rotate same, the lack of efficient lubrication for said ring and the tendency of the same to distort and leak under the influence of the varying pressures to which it is subjected during its operation. Specifically, therefore, it is my present purpose to provide a valve structure of the type disclosed in my prior patent which structure will retain all of the advantages of said patented structure and at the same time eliminate the disadvantages mentioned in respect thereto.

With the foregoing and other purposes in view, my invention consists in the novel features of construction, combination and arrangement of parts as will be hereinafter more fully described, illustrated in the accompanying drawings and defined in the appended claims.

In the drawings, wherein like characters of reference denote corresponding parts in the different views Fig. 1 is a vertical transverse section through an engine equipped with my improved rotary valve mechanism;

Fig. 2, a horizontal section on a slightly enlarged scale taken approximately on the line 2—2 of Fig. 1;

Fig. 3, a vertical transverse section through a portion of the engine cylinder with the valve removed therefrom to show the arrangement of oil grooves therein;

Fig. 4, a perspective of one form of my improved valve and a portion of the liner for driving same, showing particularly the manner of connecting the valve and liner with one another; and Fig. 5, a perspective view of a modified form of valve and liner showing particularly that these parts may be formed from one piece of material in such a way as to retain most of the advantages of the other form of my invention in which the valve and liner are formed separately from one another and detachably connected together.

The modified form of this invention illustrated in Fig. 5 is the subject-matter of my companion application, S. No. 185,899.

Referring to the drawings in detail. A designates, generally, an internal combustion engine of conventional design including, as usual, a cylinder 10, a crank case 12, a crank shaft 14, a piston 16 and a rod 18 connecting said piston with said crank shaft.

In accordance with my invention a liner 20 is mounted within cylinder 10 and piston 16 operates within said liner.

Liner 20 is provided around its outer face with gear teeth 22 with which a gear 24 meshes, said gear being driven in any suitable manner, as, for example, from the crank shaft 14 whereby said liner is rotated during reciprocation of piston 16 therein.

Liner 20 is designed to drive a rotatable ring valve 26 having a single port therein for controlling the inlet of explosive gases to and the exhaust of burnt gases from the engine, and since the latter in this instance is of the four cycle type, the gear ratio between the crank shaft and liner is such that the liner and consequently the valve will be rotated at one-half the speed of the crank shaft. However, it is to be understood that my improvements are not restricted to use with engines of the four cycle type or with a valve having only a single port therein and that if they are embodied in an engine operating on other than the four cycle principle or with a valve having more than a single port the speed of rotation of the liner with respect to the crank shaft will be varied accordingly.

A ball bearing 28 between a shoulder on liner 20 and a shoulder on the cylinder serves to hold said liner against outward longitudinal movement with respect to said cylinder, while another ball bearing 30 between the inner end of said liner and a member 32 secured in any suitable manner to a portion of the cylinder serves to hold said liner against inward longitudinal movement, said ball bearings, however, permitting free rotation of said liner as is manifest.

Preferably the outside diameter of the liner 20 is slightly less than the inside diameter of the cylinder 10 to permit expansion of the liner and to provide a lubricant receiving space between the cylinder and liner, an expansible ring or rings 34 being provided near the inner end of the liner to form a seal to prevent lubricant in the space between said liner and cylinder from flowing into the crank case, which seal in turn prevents any leakage of gas from the interior of the liner and valve around the outside of these parts into the crank case as is apparent.

The outer end of liner 20 is toothed or notched as indicated at 38, while the adjacent edge of valve 26, which is in the form of a split ring, is toothed or notched as indicated at 40, the teeth or notches of said valve interfitting with the teeth or notches of said liner whereby a driving connection is provided between said liner and valve, and whereby said valve may expand to permit its outer face to seat closely against the cylinder wall, said connection also permitting rotative adjustment of said valve with respect to said liner.

By reason of the fact that valve 26 is split and rotatable it follows that one of the ends thereof formed by the split will constitute what may be termed the lead end and the other the trailing end of said valve as regards its direction of rotation. Thus, if teeth are formed entirely around the sleeve and valve and if all of said teeth are interfitted snugly with one another the driving force of the liner will be distributed evenly entirely around the valve. This, however, is undesirable since any driving force transmitted to the trailing end of the valve tends to cause said valve to bind tightly against the cylinder wall, whereas if the driving force is transmitted only to the lead end portion of the valve same will rotate freely within the cylinder without binding against the wall thereof. Accordingly, one of my present important improvements consists in the provision of means whereby the driving force of the liner will be transmitted to the valve only at the lead end portion thereof whereby any tendency of the valve during its rotation to bind against the cylinder wall will be effectively eliminated. This purpose may be accomplished in different ways, for example, as shown in Fig. 4, by forming the teeth adjacent to the lead end of the valve so that they will interfit snugly with the teeth of the liner and by forming the remainder of the teeth of said valve, particularly those adjacent to the trailing end thereof, relatively narrow with relatively wide spaces therebetween, so that slight circumferential movement of the trailing end of the valve with respect to the liner will be permitted, or, as shown in Fig. 5, by forming the valve as an integral part of the liner, but connecting it only in the vicinity of its lead end with the liner, which may be accomplished by sawing or otherwise forming a kerf 20' at the junction of the liner with the valve to separate them except for a minor circumferential portion 20a which is left to rigidly connect them. Either of these structures will result in a valve which is freely rotatable by the sleeve, but as other methods of accomplishing the same result may suggest themselves to persons skilled in the art to which my invention appertains, I would have it understood that my invention contemplates in addition to the two specific structures mentioned, any structure whereby the driving force of a rotatable driver is transmitted to a split member only at the lead end of the latter as regards its direction of rotation.

Formed in valve 26, preferably partly in the lead end and partly in the trailing end thereof, is a port 42 adapted, during rotation of said valve, to register successively with an intake port 44 and an exhaust port 46 formed in and so spaced circumferentially of the cylinder that explosive gases will be supplied to and burnt gases exhausted from the cylinder at the proper times according to the movements of the piston within the liner to cause the engine to operate effectively on the four cycle principle.

According to a preferred arrangement of the ports 42, 44 and 46 the exhaust port becomes fully blanked by the valve 26 when the piston is substantially at its limit of outward movement within the liner 20 on its exhaust stroke, and since the next movement of the piston will be inward on its intake stroke, it follows that the valve must rotate in a direction which will result in its lead end portion overlying and blanking the exhaust port during the intake or suction stroke of the piston. As a partial vacuum is created within the valve during the intake stroke of the piston, the greater external or atmospheric pressure against the outside of said valve throughout the area thereof exposed by the exhaust port has a tendency to force the lead end portion of the valve inward with accompanying tendency to force the opposite side of the valve tightly against the cylinder wall and with consequent leakage of the valve in the vicinity of the exhaust port. To eliminate these disadvantages my invention contemplates broadly the provision of means whereby the lead end of the valve will be supported at all times by the trailing end thereof against inward movement, said means consisting specifically, for example, as herein shown, of an outwardly disposed extension or extensions 48 on the lead end of the valve overlapping an inwardly disposed extension or extensions 50 on the trailing end thereof.

Preferably the junction of the liner 20 with the valve 26 is located in the plane or substantially in the plane of the outer end of the piston 16 when the latter is at its limit of outward movement within the liner, so that oil which escapes from the crank case past the piston, and which is scraped from the inner wall of the liner by the outer end of the piston, during the normal operation of the engine, will be carried by the outer end of the piston to a point in alinement with the teeth 38, 40 or the kerf 20′ as the case may be, according to whether the structure shown in Figures 1 to 4 or the structure shown in Figure 5 is used, each time the piston reaches its limit of outward movement and will be thrown by the centrifugal force of the rotating valve and liner and by the pressure within the valve and liner during compression and power strokes of the piston either through the spaces between the teeth 38, 40 or through the kerf 20′, as the case may be, to the outer faces of the valve and liner thereby to maintain the space between the cylinder and liner constantly filled with oil and to maintain the outer faces of the valve and liner constantly and effectively lubricated. In addition, by locating the junction of the valve with the liner, as mentioned, the pressure within the valve and liner present during compression and power strokes of the piston is allowed, throughout said strokes, to exert itself upon the trapped oil contained in the space between the cylinder and liner and between the cylinder and valve with the result that said pressure will be distributed evenly by the oil entirely around the outside of the liner and valve and the internal and external pressures on the liner and valve will be balanced, resulting in a free turning liner and valve.

It is contemplated that all of the oil necessary for the lubrication of the liner and valve will be supplied to these parts from the crank case in the manner just stated, but, if desired, a passage 36 may be provided through the cylinder wall in communication with the space between the cylinder and liner whereby lubricant may be supplied by a pump or any other suitable means to said space.

I have found that by providing an annular groove 52 in the cylinder wall located approximately in alinement with the junction between the valve and liner, and by providing other longitudinally extending grooves 54 in said cylinder wall in communication with said annular groove and extending therefrom towards the outer edge of the valve, the flow of lubricant under the influence of centrifugal force and the pressures aforementioned as well as the balancing of pressures inside and outside the valve will be greatly enhanced, it being apparent that as portions of the valve pass the longitudinally extending grooves they will be effectively lubricated by the lubricant contained therein. Obviously, instead of the grooves 54 being formed in the cylinder wall they may be formed in the outer or seating surface of the valve.

While in the foregoing I have described my invention as applied to a single cylinder engine, it is manifest that it is only necessary to duplicate the structure for each cylinder of a multiple cylinder engine.

From the foregoing description considered in connection with the accompanying drawings it is believed that the operation and advantages of my improved structures will be more fully understood. I desire to point out, however, that various changes and desirable additions may be made in and to the structures shown within the spirit and scope of my invention as defined in the appended claims.

I claim:

1. A valve mechanism including a split rotatable hollow cylindrical valve member, a rotatable hollow cylindrical liner for rotating said valve member, and a connection between said valve member and liner whereby the driving force of the liner is transmitted to the valve member only at the lead end of the latter as regards its direction of rotation.

2. A valve mechanism including a rotatable hollow cylindrical valve member and a rotatable hollow cylindrical liner connected with said valve member for rotating same, said valve member being divided transversely to permit of its contraction and expansion, the connection between said valve member and liner serving to hold the lead end portion of said valve member as regards its direction of rotation, against circumferential movement with respect to said liner and permitting relative circumferential movement of the trailing end portion of said valve member with respect to said liner.

3. A valve mechanism including a valve proper in the form of a rotatable split ring, a rotatable liner for driving said ring, and interfitting teeth on said ring and liner providing a driving connection therebetween, some of said teeth interfitting tightly and other loosely with one another.

4. A valve mechanism including a valve proper in the form of a rotatable split ring, a rotatable liner for driving said ring, and interfitting teeth on said ring and liner providing a driving connection therebetween, all of the teeth in a predetermined circumferential zone of said ring and liner interfitting neatly with one another to prevent relative circumferential movement of said ring and liner within the limits of said zone, and the remainder of said teeth interfitting loosely with one another to permit relative circumferential movement of said ring and liner outside the limits of said zone.

5. A valve mechanism including a valve proper in the form of a rotatable split ring, a rotatable liner for driving said ring, and interfitting teeth on said ring and liner providing a driving connection therebetween, the teeth adjacent to the lead end portion of said ring, as regards its direction of rotation, interfitting neatly to hold the lead end portion of said ring against circumferential movement with respect to said liner and the remainder of said teeth interfitting loosely to permit the trailing end portion of said ring to move circumferentially with respect to said liner.

6. A valve mechanism including a split rotatable hollow cylindrical valve member, a rotatable hollow cylindrical liner for rotating said valve member, and a detachable connection between said valve member and liner serving to transmit the driving force of the liner to said valve member only at the lead end portion of the latter as regards its direction of rotation.

7. A valve mechanism including a split rotatable hollow cylindrical valve member, a rotatable hollow cylindrical liner for rotating said valve member, and a detachable connection between said valve member and liner serving to hold predetermined circumferential portions of these parts against relative circumferential movement and permitting relative circumferential movement between other circumferential portions thereof.

8. A valve mechanism including a split rotatable hollow cylindrical valve member, means for rotating said valve member, and means whereby the trailing end of said valve member, as regards its direction of rotation, directly supports the lead end thereof against inward movement.

9. A valve mechanism including a split rotatable hollow cylindrical valve member, means for rotating said valve member, and an abutment on the trailing end of said valve member, as regards its direction of rotation, against which a portion of the lead end thereof engages whereby said trailing end supports said lead end against inward movement.

10. A valve mechanism including a split rotatable hollow cylindrical valve member, and means for rotating said valve member, a portion of the trailing end of said valve member, as regards its direction of rotation, overlapping a portion of the trailing end thereof whereby said trailing end supports said lead end against inward movement.

11. In an engine, a cylinder, a liner rotatable within said cylinder, a piston reciprocal within said liner, a valve connected with said liner, and means providing communication between the interior and the exterior of said valve and liner at the connection of these parts with one another, said connection being located substantially in the plane of the outer end of the piston when the latter is at its limit of outward movement within the liner, said cylinder being provided with an annular groove alined with the connection between said valve and liner and further having longitudinally extending grooves formed in the face thereof against which said valve seats, said longitudinally extending grooves being in communication with said annular groove.

12. A valve mechanism including a rotatable valve member having lead and trailing ends, a rotatable liner for rotating said valve member, and a connection between said valve member and liner whereby the driving force of the liner is transmitted to the valve member only at the lead end of the latter as regards its direction of rotation.

In testimony whereof I hereunto affix my signature.

DORSETT A. DAVISON.